Mar. 13, 1923.
H. O. STEPHENS.
CASING FOR ELECTRICAL APPARATUS.
FILED OCT. 2, 1920.
1,448,009.
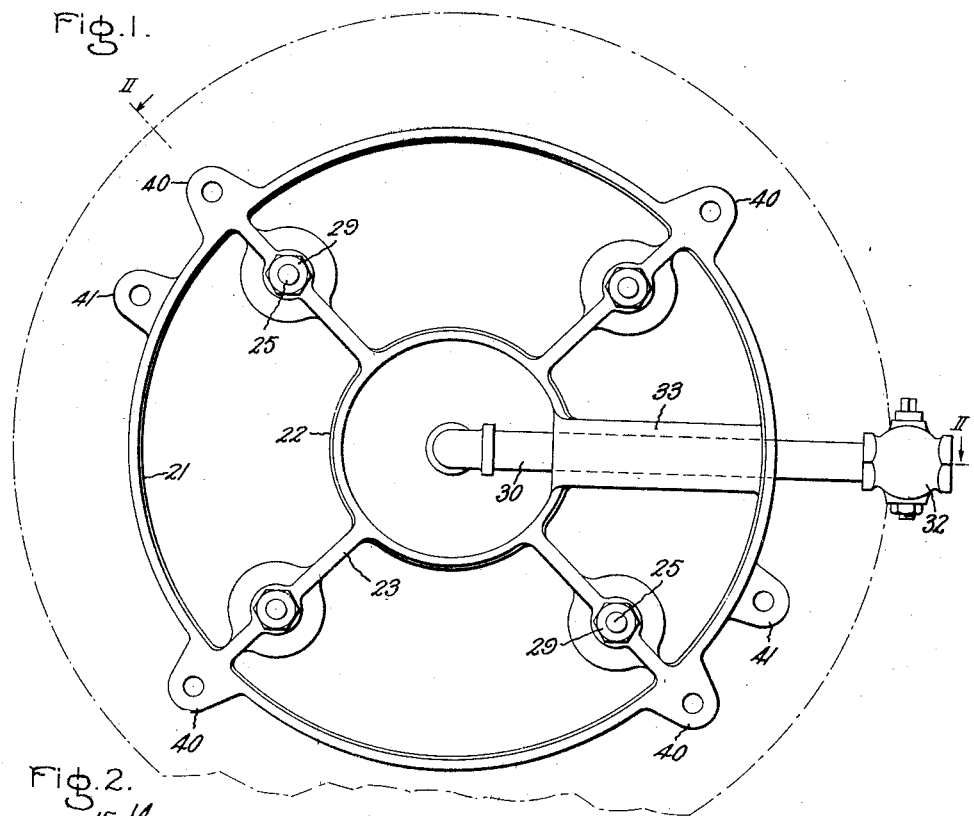
Fig.1.
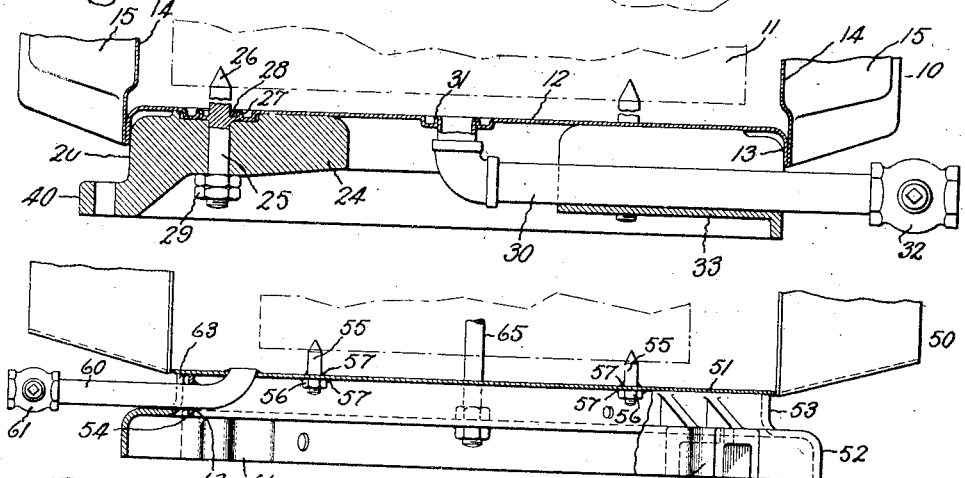
Fig.2.
Fig.3.
Inventor:
Howard O. Stephens
by Albert G. Davis
His Attorney.

Patented Mar. 13, 1923.

1,448,009

UNITED STATES PATENT OFFICE.

HOWARD O. STEPHENS, OF PITTSFIELD, MASSACHUSETTS, ASSIGNOR TO GENERAL ELECTRIC COMPANY, A CORPORATION OF NEW YORK.

CASING FOR ELECTRICAL APPARATUS.

Application filed October 2, 1920. Serial No. 414,357.

*To all whom it may concern:*

Be it known that I, HOWARD O. STEPHENS, a citizen of the United States, residing at Pittsfield, in the county of Berkshire, State of Massachusetts, have invented certain new and useful Improvements in Casings for Electrical Apparatus, of which the following is a specification.

My invention relates to casings for electrical apparatus which are adapted to be submerged in a liquid cooling and insulating medium, such as oil. More particularly my invention relates to sheet metal casings for transformers and the like and has for its object an improved arrangement of parts for mounting the tank or casing proper upon a suitable base.

It has been the practice, when manufacturing tanks or casings for oil submerged electrical apparatus of the smaller sizes, to make such tanks or casings wholly of cast metal. In extending this practice to the larger sizes, much difficulty was experienced in making the cast metal leak-proof, or non-porous to oil. This practice, however, was compromised for intermediate sizes and the walls of the tank or casing were made of sheet metal while the tops and bottoms were cast in place. Some difficulty still was experienced in making perfectly satisfactory tanks or casings; consequently it has become the practice to resort to an all sheet metal tank or casing for the largest sizes.

Some form of welding has universally been found to be the most expeditious mode of assembling the parts of an all sheet metal tank or casing. To make good welds, sheet metal of substantially uniform thickness is invariably used in all parts of the tank or casing. This latter practice has frequently resulted in bottoms made of thin metal lacking the mechanical strength necessary to support the weight of the encased electrical apparatus, since it is not desirable to make the side walls thicker than necessary both on account of cost considerations and on account of the thermal radiating properties to be imparted.

In the practice of my invention I have made use of a novel construction of a bottom and cooperating base which together provide a suitable support for the tank or casing containing electrical apparatus and at the same time has the requisite mechanical strength. Moreover, the particular arrangement of parts employed by me enables the tank and base readily to be attached and detached one from the other.

For a more complete understanding of the nature and objects of my invention, reference should be had to the following detailed description taken in connection with the accompanying drawing in which:

Fig. 1 is a bottom view of a base employed in my invention, the parts being shown in elevation; Fig. 2 is a vertical section taken on the line II—II in Fig. 1 looking in the direction of the arrows; while Fig. 3 is a similar sectional view of a modified form of my invention.

Referring now to Figs. 1 and 2 of the drawing, 10 denotes the sheet metal tank or casing which is adapted to contain an electrical apparatus such as a transformer indicated here by a broken line at 11. The tank 10 is here shown as composed of a thin metal bottom member 12 having a downturned rim 13 to which is welded or otherwise secured the continuous distended lower end portion of the side wall 14, which is here indicated as provided with deep corrugations 15. The top portion of tank 10 is indicated as broken away.

In Fig. 2 the tank 10 is indicated as surmounting a base 20, which may be of cast metal. The base 20, as indicated in Fig. 1, consists essentially of two annuli 21 and 22 connected by radial webs 23, a section of one web being indicated at 24 in Fig. 2. The diameter of the outer annulus 21 is preferably such that it fits snugly up into the depending rim 13 of the bottom member 12. The webs and annuli are so proportioned as to provide ample mechanical support for the bottom member 12; the webs 23 in this form of my invention are provided with vertical holes for receiving, centering and securing studs 25 which are fixed in the bottom member 12. The studs 25 are shown as four in number and are set at diametrically opposite points on diameters of the bottom which intersect at right angles and are provided with chamfered ends 26 on those portions which project interiorly of the tank 10. These points or chamfered ends 26 serve not only as supports but as centering devices for the electrical apparatus in the tank thereby preventing lateral displacement thereof.

The places in the bottom member where it is desired to secure the studs, are first countersunk and then pierced with holes having upstanding edges 27 which project no higher than the plane of the bottom. The stud 25 which is secured in such hole is provided with an integral frill or collar 28 which is also provided with an upstanding edge inclined toward the chamfered end. The frill or collar 28 is of such a diameter as to fit snugly against the edge 27 of the hole, the upstanding edges providing an annular welding seam just below the plane of the bottom which thus protects it.

The studs 25, secured in the bottom member 12 in this manner, will fit into the holes in the webs 23 when properly positioned. The shanks of the studs 25 are preferably of sufficient length to have portions projecting below the webs 23 when in place, which portions, if threaded, are adapted to receive nuts, as shown at 29, for securing the base 20 to the tank 10.

Tanks for housing oil submerged electrical apparatus are invariably provided with draw-off connections. It is not generally convenient to perforate the walls of corrugated tanks to accommodate such connections. Such connections are therefore most conveniently led from the bottoms of large corrugated tanks. The base 20 of my invention makes special provision for the accommodation of such connection, the draw-off connection being shown at 30 in Figs. 1 and 2. This connection is preferably secured in the bottom member 12 by welding about a counter-sunk opening as shown at 31, which is similar to the ones in which the studs 25 are secured. To support the connection 30, as it projects outwardly to a convenient point beyond the base where a shut off valve 32 is provided, the base is formed with a dished web or cradle formation 33, which extends between the annuli, the same being cut away above the formation. In this way a supporting trough is formed in the base 20 in which the connection 30 is adapted to lie when all the parts are in place.

The base 20 is shown as provided with lugs 40 by which it may be secured to any suitable foundation; it also has symmetrically disposed lugs 41 with which lifting and securing rods (not shown) may engage and which generally extend downwardly from the cover.

In the form of my invention shown in Fig. 3, a tank having deep corrugations is shown at 50. This tank has a thin sheet metal bottom member 51 which surmounts a base 52 which may be of spun or cast metal, the base having a configuration which is in general a reentrant surface of revolution, as shown. The top rim 53 of the base 52 furnishes one supporting and reinforcing annulus for the bottom member 51. A second annulus 54 is welded or otherwise secured to the bottom member itself, and is preferably of such a diameter as to fit within the rim 53 and serve as a centering device for tank 50 when placed on the base.

In the bottom member are secured centering studs 55 which have nuts 56 engaging with threaded shanks that extend through openings in the bottom member 51. To make an oil tight construction, the studs 55 have welds made thereabout both interiorly and exteriorly of the tank 50, such as I have indicated at 57.

In addition to the studs 55 there is secured in the bottom member the draw-off connection 60 provided with shut off valve 61. This connection traverses an opening at 62 in the annulus 54, and then a trough-shaped opening at 63 in the rim of base 52. The base 52 is secured in place to the tank by securing and lifting rods, as shown at 65, which engage with suitable openings in the base and extend up to and engage with suitable formations at the top of the tank; and the base may also be provided with radial offset portions, as indicated at 66, to receive base securing bolts for securing it to foundations and the like.

In each of the forms illustrating my invention, it is seen that I have provided a base that supports and reinforces the thin sheet metal bottom member of the tank proper, that the tank proper is readily removable therefrom, and that the base is adapted to accommodate and support the draw-off connection.

Having now described what is at present the best means known to me for carrying out an embodiment of my invention, I would have it understood that such means are merely illustrative and that I do not mean to be limited thereby to the exact details shown nor restricted in the choice of recognized equivalents except as defined in my claims hereunto appended.

What I claim as new and desire to secure by Letters Patent of the United States, is:—

1. The combination with a sheet metal casing for electrical apparatus, of a base adapted to support the same, and a draw-off connection in the bottom of said casing; said base comprising a reinforcing annulus for the bottom of said casing, and a cradle formation adapted to support said draw-off connection.

2. The combination with a sheet metal casing for electrical apparatus, of a base adapted to support the same, and a draw-off connection in the bottom of said casing; said base comprising a reinforcing annulus for the bottom of said casing, a cradle formation adapted to support said draw-off connection, and means for securing said casing to the base.

3. The combination with a sheet metal casing for electrical apparatus, of a base adapted to support the same; said base comprising a plurality of reinforcing annuli, a web construction connecting said annuli and provided with vertical openings therein, and securing studs projecting from the bottom of said casing adapted to engage with said openings and secure said casing to the base.

4. The combination with a sheet metal casing for electrical apparatus, of a base adapted to support the same; said base comprising a plurality of reinforcing annuli, a web construction connecting said annuli and provided with vertical openings therein, and studs secured in the bottom of said casing, said studs projecting above the bottom of the casing to support electrical apparatus encased therein and projecting below the bottom of the casing to engage said openings in the web construction to secure the casing to the base.

5. The combination with a sheet metal casing for electrical apparatus, of a base adapted to support the same and provided with vertical openings therein, and studs secured in the bottom of said casing, said studs projecting above the bottom of the casing to support electrical apparatus encased therein and projecting below the bottom of the casing to engage said openings in the base to secure the casing to the base.

6. The combination with a sheet metal casing for electrical apparatus, of a base adapted to support the same; said base comprising a plurality of annuli, a plurality of radially disposed webs connecting said annuli and provided with vertical openings, and securing studs projecting from the bottom of said casing adapted to enter said openings and provided with threaded shanks projecting below said webs and having nuts engaging the threaded shanks for securing said casing to the base.

7. The combination with a sheet metal casing for electrical apparatus, of a base adapted to support the same, and a draw-off connection in the bottom of said casing; said base comprising a plurality of annuli, a plurality of radially disposed webs connecting said annuli and provided with openings, a cradle formation connecting said annuli and adapted to support said draw-off connection, and studs secured in the bottom of said casing arranged to engage with said openings and secure said casing to the base.

8. The combination with a sheet metal casing for electrical apparatus, of a base adapted to support the same, and supporting studs in the bottom of said casing for securing said casing to said base, each of said studs being formed with an integral frill adapted to be welded in correspondingly formed holes in the bottom of said casing.

9. The combination with a sheet metal casing for electrical apparatus, of a base adapted to support the same, and supporting studs in the bottom of said casing for securing said casing to said base, each of said studs being formed with an integral frill having an upturned edge adapted to engage with and be welded to a corresponding edge about an opening in a countersunk portion of the bottom of said casing.

In witness whereof, I have hereunto set my hand this 29th day of Sept., 1920.

HOWARD O. STEPHENS.